United States Patent [19]
Vorms et al.

[11] 3,883,076
[45] May 13, 1975

[54] ROTARY NOZZLE FOR SPRAYING LOW-CALORIC FLUID VISCOUS SUBSTANCES IN PROCESS OF BURNING

[76] Inventors: Georgy Alfonsovich Vorms, prospekt Oktyabrya 133, kv. 35.;
Petr Ivanovich Kuznetsov, ulitsa Rossiiskaya 56"v", kv. 51.;
Vladislav Borisovich Volkov, ulitsa Koltsevaya 169, kv. 6., all of Ufa, U.S.S.R.

[22] Filed: Oct. 31, 1973

[21] Appl. No.: 411,409

[52] U.S. Cl. ............................ 239/214.23; 239/405
[51] Int. Cl. ................................................. B05b 3/02
[58] Field of Search ... 239/405, 406, 77, 78, 214.23

[56] References Cited
UNITED STATES PATENTS

| | | | |
|---|---|---|---|
| 1,680,455 | 8/1928 | Fesler et al. | 239/214.23 |
| 2,692,015 | 10/1954 | Breed | 239/214.23 |
| 3,258,057 | 6/1966 | Keyes et al. | 239/405 |
| 3,563,470 | 2/1971 | Suzuki et al. | 239/405 |
| 3,775,039 | 11/1973 | Pillard | 239/406 |

*Primary Examiner*—Lloyd L. King

[57] ABSTRACT

A rotary nozzle for spraying fluid low-caloric viscous substances in the process of their burning comprises a housing installed wherein is a hollow shaft with provision made for its rotation, accommodating a rotary sprayer on its end, and a tapered narrowing circular air duct arranged around the rotary sprayer. A pipe is installed inside the hollow shaft for supplying fluid substances to the internal surface of the rotary sprayet. Located in the place of minimal outlet cross-section of the circular air duct, are rotatable blades which vary the cross-section for controlling the amount of air supplied to maintain burning, as well as provide the swirling of the air flow in the direction reverse to that of the rotary sprayer rotation.

5 Claims, 2 Drawing Figures

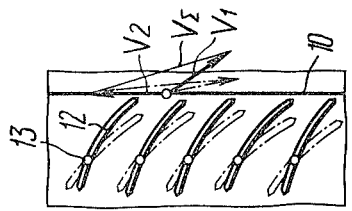
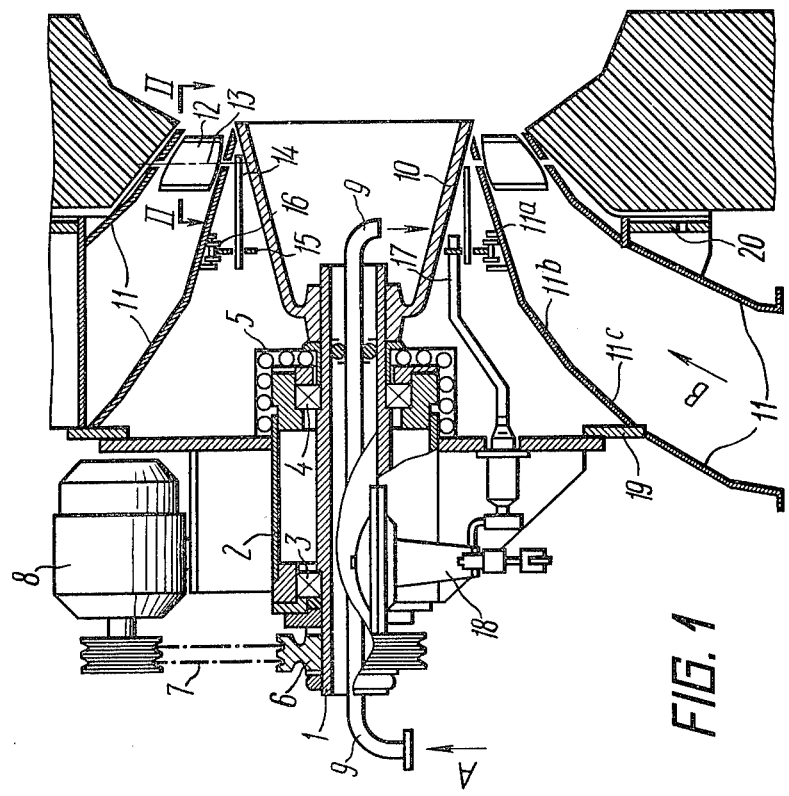

ROTARY NOZZLE FOR SPRAYING LOW-CALORIC FLUID VISCOUS SUBSTANCES IN PROCESS OF BURNING

The present invention relates to rotary nozzles, and more particularly, to rotary nozzles for spraying low-caloric fluid viscous substances, e.g. industrial wastes of high and variable viscosity contaminated with mechanical impurities, in the process of burning them.

The proposed invention can most efficiently be utilised in burning highly viscous low-caloric fluid or artificially fluidised fuels or industrial wastes used as fuel, or other industrial wastes with similar properties subject to be eliminated.

These wastes having a calorific power sufficient to maintain independent burning, require a small amount of air for their own burning, however they impose more stringent requirements on the degree of dispersiveness due to their increased viscosity and contamination with mechanical impurities.

The present invention can most efficiently be applied to burning such industrial wastes as, e.g. oil sludge.

The problem of dispersing cheap and low-caloric fluid or artificially fluidised fuels and, what is more, wastes fuels by using a simple and fail-safe device, has been for a long time encountered by a number of industries.

This problem is especially acute to oil processing and petrochemical plants, since the cleaning of apparatus, sump reservoirs, oil-catching devices, etc. located on these plants results in accumulating rather a large amount of waste taking the form of a fluid mass which constitutes the bulk of the oil sludge which is the main source of water and air pollution.

Oil sludge is a mixture of contaminated water, tarred oil products, particles of sand and clay, scale, corrosion-decay products, particles of coke, etc. Often such a mixture is colloidally stabilised by traces of used reagents, e.g. used alkali, and takes the form of gel or thick paste. This mixture of industrial wastes or the oil sludge has a highly variable and high viscosity. As a rule, the higher the viscosity, the larger the amount of mechanical impurities contained in oil sludge, and hence, its dispersion is harder and coarser than is the case with conventional types of fuels.

At present this problem is sought to be solved at a number of plants by means of adding full-value fuel taken in excess into oil sludge or at the expense of reduced reclamation of oil products from the waste. The dillution of wastes by oil products is an unprofitable measure and, as it is, it solves only the first, simpler part of the problem, i.e. the satisfactory ignition of the waste, and does not solve the second part of the problem, i.e. the attainment of complete burning, i.e. complete burning of tars, oil film, particularly when they are comprised between particles of non-inflammable mechanical impurities and ash ingredients, stuck together.

Experience has shown that for wastes of the oil sludge type having a high viscosity and a calorific capacity sufficient for independent burning, small admixtures of full-value fuel provide satisfactory ignition with the degree of dispersiveness that the present-day nozzles provide. But to obtain complete combustion in the nozzles utilised at present (a criterion for that is a short torch without soot and no products of non-complete combustion or cancerous substances in smoke gases), use should be made of larger admixtures of fuel-value fuel. In this case, it is desirable that the waste be thinned by medium distillate fractions and not by residual fuels.

In a number of countries while eliminating such wastes attempts have been made to smash the lumps of mechanical impurities glued together by a highly viscous or tarred oil product in order to subject them to air oxygen not in the course of dispersion (i.e. prior to burning), but immediately during burning, utilising for that purpose a device with an air-fluidised bed. But as experience gained in service has shown, it is difficult to provide complete combustion of low-caloric wastes in such devices since it is impossible to maintain the required temperature in the burning area constant (stable), therefore, it is necessary to obtain an area of burning as compact as possible and to seal it for the low-caloric fuels. However, these conditions are practically difficult to be realised in the devices with an air-fluidised bed, therefore a need arises to add a large amount of heat at the expense of additional fuel.

In general, such a device turns out to be very expensive. Besides, these devices can burn not any oil sludge, but only that which contains not less than 36–40 percent of oil product and where additional fuel is used for heating air. All in all, the expenses will run to not less than 45–50 percent, though theoretically the indepent burning of oil sludges seems to be possible with 20 percent of oil products contained in them.

Known in the prior art are nozzles which burning full-value fuels provide a very compact torch and are reliable in operation. They comprise a tapered circular air chamber with air being supplied tangentially therein. Installed co-axially in the chamber is a jet having a diameter providing an unobstructed passage for the slumps of mechanical impurities through which the fluid substance to be burned is supplied under pressure. According to the available data (Lykov M. V. and Leonchik B. M. "Spraying driers," Moscow, 1967, p. 57) the dispersiveness of spraying in such nozzles largely depends on the pressure of air and on the air-to-fluid ratio. Tests conducted with oil sludge have shown that satisfactory spraying can only be attained for such a highly viscous fluid as the medium oil sludge (40–70 poises) containing mechanical impurities (10–12 percent) and 25–30 percent of combustible components when the consumption of air constitutes 4.5 Nm$^3$/kg and the pressure is 4 atm. However, such an amount of air is high in excess for burning and it decreases the temperature in the area of burning, therefore, it is necessary either to increase pressure, or to resort to adding preliminarily full-value fuel to the waste.

Another disadvantage of the pneumatic nozzle is the impossibility to design it for a capacity of over 600–1,000 kg/h.

Besides, the pneumatic nozzle has a narrow range of controlling productiveness which amounts to 80–105 percent of the rated value, and when the variations are large, it provides incomplete combustion.

These nozzles are expensive in operation and used only for burning wastes containing not less than 35–40 percent of oil products and not more than 1–2 percent of mechanical impurities and are completely unsuitable for burning oil sludges with 22–27 percent of mechanical impurities.

Known is a device for spraying thinly ground coal which is adapted by adding an appropriate amount of water to a state when this suspension can be pumped by a pump. The device is constructed in the form of a rotary nozzle which comprises a housing with bearings wherein a hollow shaft is rotated driven by a V-belt drive from an electric motor and accommodating on its end that faces the firebox a cup-shaped sprayer. Installed inside the hollow shaft is a pipe through which the water suspension to be burned is supplied to the internal surface of the rotary sprayer. For the purpose of utilising hot air when burning the water-coal suspension, a water-cooled screen is installed around the bearings. Connected to the outlet spraying edge of the rotary sprayer is a tapered narrowing circular channel embracing the housing and the rotary sprayer used to supply hot air to maintain burning. Provision is made fot a controllable circular gate to be installed on the inlet of the channel.

The viscosity of the water-coal suspension for which the device is designed is highly variable depending on the content of water and, in general, it is rather high but from the point of view of spraying, it is still a preliminarily thinned product whose individual particles are "fastened" to each other only by a film of low-viscous water. At this point, the mixture should be thrown into the flow of air, and thereafter, should there be any lumps of coal particles stuck together, they will dry in the atmosphere of the firebox space, ignite and burn out by themselves. A highly viscous fluid substance is impossible to be preliminarily prepared for sprayer. It is on the edge of the rapidly rotating rotary sprayer, that it should be extended by means of centrifugal forces into a thin film, and when the film breaks loose from the sprayer edge, it should be immediately, on the impact with the surrounding air, sprayed into very small drops.

Good-quality and stable spraying of viscous and highly viscous liquids by rotary sprayers has been studied very well, but it is accomplished by developing a peripheral speed on the edge of the rotary sprayer for the most low-viscous fluids which should be not lower than 60 m/s and for more viscous fluids preferably 90–140 m/s.

Proceeding from that, it is necesary to have 8–10 thousand revolutions per minute of the shaft to be able to spray a highly viscous and sometimes even a pasty waste such as oil sludge (and in fact, some good sprayers develop up to 12 thous, rpm). But this involves a very complex running gear of the sprayer requiring a high accuracy of fabrication and location of the device in a separate heated building, and not outdoors. As a result, the device which provides a really good quality of spraying viscous or highly viscous fluid substance by means of previously known methods only at the expense of employing larger numbers of revolutions is rendered expensive and troublesime in operation and is completely inadapted to be installed, e.g. in the firebox of a waste-heat boiler or in the firebox of a process furnace.

Apart from that, it is very important to have a wide range of nozzle control for burning low-caloric and viscous fluid substances with irregular composition whose supply to the burner is subjected to considerable seasonal and other variations. All the nozzles of the prior art are equipped for that purpose with slide gates on the air duct, rotatable gates installed in front of the nozzle inlet or, if necessary, to improve accuracy, with control valves, etc. However, as a result of such control, it always turns out that when decreasing the amount of air supplied to maintain burning, the speed of air in the outlet cross-section is also decreased proportionally, thereby impairing spraying, i.e. limiting, in fact, the controlability of the nozzle. For full-value kinds of fuel in such cases resort is made to increasing the numbers of revolutions of the rotary sprayer. But for low-caloric and viscous fluid substances and wastes whose spraying is more difficult and at the same time the dispersion must be thin, and for which the economic factors are more acute, such control of air in front of the nozzle is unsuitable, therefore a need arises to provide a nozzle with a wide range of air control.

An object of the present invention is to provide a nozzle for spraying low-caloric fluid or artificially fluidised high viscous fuels or wastes including industrial wastes highly contaminated with mechanical impurities and having an abnormal viscosity, e.g. oil sludges. Such a nozzle, being less complex in fabrication and maintenance, should provide a rather fine dispersion, accelerated ignition and a short torch, as well as complete combustion and to have an increased potential for failsafe operation making use of the fan air and without requiring any spacial conditions on the place of mounting.

Another object of the present invention is to provide such a rotary nozzle for spraying the aforementioned fluid substances which due to a good quality of spraying could burn with a good degree of combustion mixtures with a possibly lower calorific power.

Still another object of the present invention is to provide such a rotary nozzle for spraying and burning the aforementioned fluid substances which would have a rather wide range of control, e.g. from 15–20 percent to 100–110 percent of the rated capacity, retaining a high degree of spraying in the course of burning within this entire range and would be able to maintain automatically the optimum ratio of air to calorific power of the mixture to be burned to make one and the same nozzle able to satisfy any seasonal vibrations in the composition anf amount of waste.

In attaining the aforementioned and other objects the rotary nozzle for spraying fluid low-caloric viscous substances in the process of their burning, comprising a hollow shaft with provision made for its rotation in the housing, a rotary sprayer installed on the end of the shaft, a pipe located inside the shaft to supply fluid substances to the internal surface of the rotary sprayer and a tapered narrowing circular air duct arranged around the rotary sprayer, has, according to the invention, in the place of the smallest outlet cross-section of the circular air duct rotatable blades providing the variation of the cross-section for controlling the amount of air supplied for burning and for swirling the air flow in the direction reverse to that of the rotary sprayer rotation.

This attributes to the spraying portion of the rotary nozzle the following new properties.

Firstly, when utilising a very wide range of varying the amount of air supplied to maintain burning, its rate of flow to the edge of the rotary sprayer is almost unchangeable, and to be more precise, it increases a little when controlling air with the said rotatable blades for narrowing the flow, i.e. the degree of spraying in the said wide range either remains unchanged, or even improves a little. This fact in conjunction with a constant number of revolutions of the rotary sprayer provides a completely new hydrodynamic characteristic of the nozzle in general, a very favourable for all without exception kinds of fluid fuels and extremely valuable for low-caloric fuels and wastes, especially if they are intended to be burned in the firebox of the waste-heat boiler which imposes its additional requirements on the stability and the controlability of the burning process.

Secondly, swirling the air flow in the direction reverse to that of the rotary sprayer rotation effected by the same rotatable blades which at any amount of air being controlled do not change the value of the vector of air speed at the point of its outlet, only changing its angle, provides a completely different of vectors of the peripheral speed of the spraying edge and the speed of air flowing on the edge. This makes it possible either to increase the resultant vector, i.e. the "speed of impact" between the film of the fluid and the air by more than 1.5 times, or makes it possible to decrease the number of revolutions almost twofold with the same effect being attained. Thus, transferring the air control to the very point of air flow and the counter-swirling of the air flow make it possible to essentially decrease the number of revolutions of the rotary nozzle retaining a particularly thin dispersion required for the low-caloric fuels and viscous industrial wastes, which, in turn, makes it possible to render the rotary nozzle considerably simpler and cheaper providing at the same time an increased service life of its fail-safe operation.

It is expedient that the rotatable blades located inside the circular air duct be, preferably curvilinear with a curvature directed in the direction of swirling the air flow.

It is desirable that the circular air duct be constructed from many tapered elements forming a smooth profile of the first half of the Venturi circular tube.

It is recommended that the outlet cross-section of the Venturi circular tube be primarily located so as to coincide with the plane of rotation of the outlet edge of the rotary sprayer and to select their mutual arrangement in the direction of the radius so that the outlet edge of the rotary sprayer be located approximately on the extension of the surface of the internal taper forming the outlet cross-section of the Venturi tube preferably extending beyond the extension of the surface into the area occupied by the air flow by 1:200–1:100 of the rotary sprayer diameter.

The directional curvature of the rotatable blades and the smooth outline of the circular air-supplying channel according to the profile of the Venturi tube on the section where air pressure is transformed into air speed make it possible to increase the vector of air speed by 1.6–1.7 times without increasing pressure for that purpose. An insignificant extension of the spraying edge into the air flow improves considerably the quality of dispersion because the film of viscous substance that breaks loose from this edge immediately impacts on the air flowing at full speed characteristic of the central portion of the air flow.

All this combined makes it possible to use instead of, say, 8–10 thousand revolutions per minute which are necessary for a conventional rotary nozzle to obtain excellent dispersion of any low-caloric fluid fuels or highly viscous and contaminated industrial wastes, at least three times lower revolutions. This is much less than even 5–6 thousand r.p.m. commonly accepted for the full-value types of fuels and makes it possible to use a medium-pressure fan to supply, air for the burning process. In case if the low-caloric fuel to be burned or the waste to be burned can burn independently, this alone provides a short torch and a high degree of combustion. As a result, such a rotary nozzle efficiently solves the problem of complete combustion of viscous and contaminated with mechanical impurities fluid substances and fluid industrial wastes, it has a new much more favourable controlling characteristic making it possible to utilise it in a firebox of the waste-heat boiler or in the firebox of a process furnace and apart from that, it is much simpler in production and operation.

Other objects and advantages of the invention will become more apparent from the following embodiment and drawings wherein:

FIG. 1 represents schematically a longitudinal cross-section of a rotary nozzle, according to the invention;

FIG. 2 represents a view taken on the section II—II.

The rotary nozzle comprises a hollow shaft 1 (FIG. 1) installed in the housing 2 on the bearings 3 and 4 with the latter being mounted on the end of the shaft 1 facing the firebox (not shown in the drawing) and protected from external radiation by the water-cooled screen 5.

The shaft 1 is rotated through the sheave 6 and V-belt drive 7 from the electric motor 8. Located inside the hollow shaft I is a pipe 9 for supplying fluid substances to be burned to the internal surface of the cup-shaped rotary sprayer 10 mounted on the end of the shaft I. Arranged around the housing 2 and the rotary sprayer 10 is a tapered narrowing circular air duct II; the rotatable blades 12 with their axles 13 are located in its outlet cross-section. Fastened to the axles 13 are rods 14 which are pivotally connected to the large rotatable ring 15. This ring 15 is held in place by rollers 16 and can be rotated by some angle with the aid of the crank lever 17 which receives the necessary rotation from the pneumatic working drive 18 which, in turn, is controlled by a gas-analysing device or other instrument (not shown in the drawing) sensitive to the size of excess oxygen in smoke gases.

The housing 2 with the hollow shaft 1 and all the elements relating to the running gear of the rotary nozzle are combined into one assembly unit with the aid of the flange 19, and the air duct 11, the rotatable blades 12 and the mechanism for controlling their rotation are combined into another assembly unit by means of the flange 20.

The rotary nozzle of the proposed invention operates in the following manner:

The fluid mixture subject to be burned is supplied along the arrow A to the pipe 9 located inside the hollow shaft 1 wherefrom the mixture to be burned proceeds to the internal surface of the rotary sprayer 10. All passages for the mixture to be burned are designed to allow an unobstructed flow of hard inclusions measuring up to 6 mm in order to simplify, and in a number of cases to eliminate altogether the preliminary filtering of wastes.

The electric motor 8 rotates rapidly through the V-belt drive 7 and the sheave 6 the hollow shaft I and the cup-shaped rotary sprayer 10 mounted on its end so that it faces the fire-box. The mixture to be burned after settling on its internal surface, spreads thereon due to the action of the centrifugal forces taking the form of a thin, more or less, uniform film and slides to the outer edge of the sprayer 10. Having broken loose from this edge, the thin layer or the film of the fluid mixture to be burned considerably extends and becomes thinner and at the impact with air it breaks into small drops which become the smaller, the stronger the impact on the air.

To make the impact of the film of the fluid waste to be burned on the air stronger, the flow of air is being swirled by the rotatable blades 12 in the direction reverse to that in which the rotary sprayer 10 is rotated, as is shown in FIG. 2, in the form of the vector of air speed $V_1$ and the vector of peripheral speed $V_2$ of the spraying edge. As can be noted from the triangle of speeds, the increase of the angle between the vectors $V_1$ and $V_2$ up to 150–160° considerably increases the vector of the resultant speed $V_\Sigma$ or the "speed of impact."

And, moreover, to render the impact as strong as possible, fully realisable for a shorter period of time and therefore better for smashing the film and to apply it exactly in that place near the very edge of the rotary sprayer 10 where the film of the fluid substance to be burned is thinnest and it had no time to assemble into threads (or drops around the particles of mechanical impurities) under the effect of the surface tension forces, the spraying edge of the rotary sprayer 10, as is shown in FIG. I, extends into the middle of the air flow at a distance that is a little larger than the thickness of the air flow layer located around the wall, e.g. by 1:200 – 1:100 of the diameter of the rotary sprayer 10.

Air supply to the edge of the rotary sprayer 10 is effected along the arrow B by the fan (not shown in the drawing) into the circular air duct II profiled as the first half of the Venturi circular tube; located in the narrowest cross-section or in the mouth of the Venturi tube are the rotatable blades 12 profiled curvilinearly, which, as is shown in FIG. 2 in dotted lines, with an increase of the rotation, reduce free passage for the air, i.e. effect a smooth and stageless control within a very wide range of the amount of air without decreasing the value of the vector of speed $V_1$ at which it flows but only changing its direction (in FIG. 2 it is shown in dashed lines) at an increased angle to the vector of the peripheral speed $V_2$. As a result of geometrical addition of the vectors, it is possible to obtain the resultant speed $V_\Sigma$ of collision or impact between the film and air.

The self-control by the rotation of the blades 12 is effected by the pneumatic working drive 18 from the system that automatically maintains a certain amount of excess oxygen in the exhaust smoke gases. This operating drive proportionally rotates the ring 15 capable of rotating in the rollers 16. Such displacements of the ring 15 transfer the rods 14 mounted on the axles 13 of the blades 12 into new positions, i.e. transfer the blades 12 into the position shown in FIG. 2 in dashed lines. Thus a new triangle of speeds (also represented in a dashed line) is provided wherein the resultant speed $V_\Sigma$ of impact between the film and air is practically the same, and, to be more precise, a little better than prior to controlling the amount of air.

The rotary nozzle with such a controlling characteristic of the air flow is adapted automatically to the variations in the compositions of the substance to be burned and, if necessary, to the variations in its amount, i.e., it, from this point if view, is quite suitable to be installed in the firebox of the waste-heat boiler or the firebox of the process furnace which makes iit possible to turn the burning of low-caloric wastes from unprofitable business into partially unprofitable or into a business with no loss whatsoever.

The following examples indicate that the constant vector of speed of the air running onto the edge of the rotary sprayer 10 and the counter-swirling of air improve, in fact, very much dispersion, or providing uniform dispersion, make it possible to considerably reduce the number of revolutions of and simplify the rotary nozzle, improve its reliability, etc.

EXAMPLE 1

The rotary nozzle, according to the invention, having been in service for two years is capable of spraying and burning properly a mixture of wastes containg 22 percent of combustible ingredients as compared to the theoretical minimum of 19.5–20 percent, i.e. with a small variation of 2–2.5 percent between the practical and theoretical minimum. For the nozzles of the prior art this variation amounts to not less than 10–15 percent, provided that the mixture to be burned does not contain mechanical admixtures, and to 20 percent and over, if the mixture to be burned incorporates mechanical impurities.

EXAMPLE 2

The same rotary nozzle when tested with fluid substances of different viscosity and different degree of contamination with mechanical impurities has shown:

a. a good degree of combustion at 2,500 r.p.m. (conformed to the diameter of the sprayer which is conventional for rotary nozzles using full-value fuel), when viscosity was from 5–10 to 40–70 poises, the amount of mechanical admixtures amounted to 2–10 percent, the amount of waste to be buurned — 3.5–4 t/h and the amount of combustible ingredients - up to 22 percent;

b. stable burning when viscosity was 105–250 poises, the amount of mechanical admixtures - 22–27 percent, the amount of combustible ingredients - 25–27 percent and even when the amount of waste to be burned was reduced to 2.5 t/h, a torch of extensions was provided at 2,500 r.p.m. (conformed to the diameter). Following the replacement of the sheave in the V-belt drive and working at 3,000 r.p.m. (conformed to the radius), the nozzle provided complete combustion of such pasty mixture in the torch measuring about 3 m; probably, there was a possibility to reduce the content of combustible components by 2–3 percent.

EXAMPLE 3

In the course of the mentioned 2 years there have been periods when the nozzle burned mixtures containing 35–40 percent and, on a few occasions, even 55 percent of combustible ingredients. As that took place, it was found out that due to very good dispersion, increased temperatures had developed in the firebox; not to melt the inexpensive lining the coefficient of air excess was increased.

Thus, this nozzle can serve in some particular cases when having a good waste-heat boiler or a proper process furnace for saving the expenses involved in a fuller separation of combustible ingredients from the waste and for burning the latter as it is making full advantage of the heat being released.

With these variations in the operational conditions, this rotary nozzle has worked faultlessly for two years without any repairs required.

What is claimed is:

1. A rotary nozzle for spraying fluid low-caloric viscous substances in the course of their burning, comprising: a housing; a hollow shaft rotatably installed in said housing; a rotary sprayer located on the end of the said hollow shaft; a pipe for supplying fluid substances to the internal surface of said rotary sprayer; a circular air duct narrowing in a taper and located around said rotary sprayer; rotatable blades located in the minimal outlet cross-section of said circular air duct and providing the variation of the cross-section of said air duct for controlling the amount of air supplied to maintain burning and swirling of the air flow in the direction reverse to that of the rotation of said rotary sprayer.

2. A rotary nozzle as claimed in claim 1 wherein said rotatable blades located inside said circular air duct are curvilinear with a curvature directed in the direction of the swirling air flow.

3. A rotary nozzle as claimed in claim 1 wherein said circular air duct is constructed from a plurality of interfaced tapered elements forming a smooth profile of the first half of the Venturi circular tube.

4. A rotary nozzle as claimed in claim 2 wherein said circular air duct is constructed from a plurality of interfaced tapered elements forming a smooth profile of the first half of the Venturi circular tube.

5. A rotary nozzle as claimed in claim 3 wherein the outlet cross-section of said Venturi circular tube coincides substantially with the plane of rotation of the outlet edge of said rotary sprayer, their mutual arrangement in the direction of the radius being such that said outlet edge of the said rotary sprayer is located on the extension of the surface of the internal taper forming the outlet cross-section of the Venturi tube extending substantially beyond this surface and into the area occupied by the air flow.

* * * * *